UNITED STATES PATENT OFFICE.

WILLIAM W. HUBBELL, OF LAMOKIN FARM, VIRGINIA.

FERTILIZER.

SPECIFICATION forming part of Letters Patent No. 240,025, dated April 12, 1881.

Application filed January 14, 1881. (Specimens.)

*To all whom it may concern:*

Be it known that I, WILLIAM WHEELER HUBBELL, resident in Appomattox county, State of Virginia, on Lamokin Farm, have invented a new and useful Improved Fertilizer for Land, and adapted to all crops of grain, grass, and vegetables and all kinds of land; and I hereby declare the following to be the component parts, proportions, and manner of making and using the same.

The fertilizer is a compound consisting of guano, bone-dust, plaster or sulphate of lime, and German potash, and of the following proportions: guano, two hundred (200) pounds; bone-dust, four hundred (400) pounds; plaster, eight hundred (800) pounds; German potash, two hundred (200) pounds. Mix them together with a shovel, and sift them together through about a No. 6 size of wire-seive, and keep them dry until used. The guano is usually Peruvian and containing about six to ten per cent. of ammonia. The plaster or sulphate of lime is finely pulverized. The bone-dust consists of any bones ground fine, such as the bones of quadrupeds, or in place thereof fossil bones, such as the phosphate-beds found in South Carolina, or both. The substance known as German potash is the refuse of the manufacture of chlorides of potassium and sodium from kainit-beds at Stassfurt, Prussia.

The proportions stated, when compounded together, form a fertilizer which experiment has demonstrated does not injure the seed or grain and does not fire or burn the crop, and this fertilizer, by its ammonia held as a sulphate, and its nitrogen, phosphate, and potash, quickens the growth of the crop, feeds it to maturity, and keeps the land when the crop is removed in an improved and improving condition, and is suited to all crops and all land.

The proportions may be varied slightly without materially changing the fertilizer.

Wherever the German potash is not readily obtainable in the markets, its substantial equivalent may be obtained by mixing about fifty pounds of muriate of potash with about one hundred and fifty pounds of common salt, to form the two hundred pounds of German potash. The sulphate of lime converts the whole into a compound sulphate fertilizer possessing every property necessary to start, subsist, and mature vegetable growth, and leave the land, when the crop is removed, in an improved and improving condition.

The previous or first formula I have given is the best practical form at the present time of my invention, as the materials are now easily purchasable in the markets of the world.

To use the fertilizer, put a handful to the hill of corn; and for drilled-in or broadcast seed or grain sowing, spread about five hundred pounds to the acre of land, and harrow or drill it in with the seed.

I am aware that heretofore guano, sulphate of lime, and bone-dust have been combined with various salts; but am not aware that they have ever before been combined with the described salts or in the proportions set forth.

What I claim as my invention is—

The compound or fertilizer consisting of guano, bone-dust, sulphate of lime, and German potash, or described chemical equivalents, in or about the proportion specified, substantially as and for the purposes described.

WM. WHEELER HUBBELL.

Witnesses:
JAS. A. TAIT,
JACOB J. ELIAS.